United States Patent [19]
Matheson et al.

[11] Patent Number: 5,161,954
[45] Date of Patent: Nov. 10, 1992

[54] DE-SLUDGING SYSTEMS

[75] Inventors: John Matheson, Higher Heath; Peter Hassall, Werrington; Colin Smith, Cheadle, all of England

[73] Assignee: Thomas Willett & Co. Ltd., United Kingdom

[21] Appl. No.: 649,610

[22] Filed: Feb. 1, 1991

[30] Foreign Application Priority Data

Feb. 8, 1990 [GB] United Kingdom ............... 9002801
Nov. 21, 1990 [GB] United Kingdom ............... 9025348

[51] Int. Cl.$^5$ .................. F04B 49/02; F04B 49/08
[52] U.S. Cl. .............................. 417/12; 417/46; 417/390; 417/900; 210/741
[58] Field of Search ............ 417/900, 12, 46, 390; 210/741

[56] References Cited

U.S. PATENT DOCUMENTS 3,477,380 11/1969 Johanson et al. ................. 417/46
4,439,325 3/1984 Blais .................................. 210/741

FOREIGN PATENT DOCUMENTS 3836530 5/1990 Fed. Rep. of Germany ...... 210/741
0032681 2/1984 Japan ................................ 417/46

Primary Examiner—Richard A. Bertsch
Assistant Examiner—David W. Scheuermann
Attorney, Agent, or Firm—Learman & McCulloch

[57] ABSTRACT

Apparatus for periodically drawing accumulated sludge (12) from a settlement tank (10) includes a hydraulically powered ram type positive displacement pump (14), operation thereof being controlled automatically in a timed or other sequence in response to signals derived from a pressure transducer (34), conveniently in the hydraulic supply line (24), said signals being a function of the pressure exerted by the pump ram (22) in operation and hence the density or other properties of the material being handled by the pump, a higher pressure showing the presence of sludge and a lower pressure its absence.

11 Claims, 2 Drawing Sheets

DE-SLUDGING SYSTEMS

BACKGROUND OF THE INVENTION

This invention relates to de-sludging systems, more specifically to systems for automatic removal of accumulations of sludge from holding, settling, or like tanks or plants in the course of processing or treating sewage or other effluent, water or other liquid purification or other processes involving sludges, slurries or other liquids or semi-liquids with solid content.

The invention further relates to automatic sludge pumping apparatus to be operatively employed in said systems.

SUMMARY OF THE INVENTION

The object of the invention is to provide a system and/or pumping apparatus therefor which will operate automatically in a reliable and efficient manner with minimal supervision, and which is adaptable in accommodating wide variations in loading or throughput under varying operating conditions.

According to one aspect of the invention there is provided pumping apparatus for automatic de-sludging including a ram-type positive displacement pump having a suction inlet connection for operatively drawing accumulations of sludge from a settling tank or other processing or holding vessel and a delivery outlet for onward transmission of said sludge; hydraulic drive means powering the pump for reciprocation of the pump ram; and control means including a pressure transducer providing a signal which is a function of the pressure exerted by said ram in the course of each delivery stroke of the pump, and feedback means regulating operation of the pump automatically as a function of said signal whereby said operation suspended or deferred when said pressure exerted by said ram falls below a predetermined level due to the lower viscosity of the material passing through the pump once an accumulation of sludge has been substantially removed from said vessel.

Conveniently said pressure transducer is arranged to sense the pressure of the hydraulic fluid in the hydraulic drive means.

The control means may further include a stroke counting device for providing a read-out of the number of delivery strokes effected by the pump and/or a stroke timing device for providing a read-out of the time taken for completion of a delivery stroke or a sequence of delivery strokes and said read-out or read-outs may be applied automatically in the regulation of the operation of the pump e.g. its stopping and starting in combination with said feedback from the pressure transducer.

The control means may be arranged to monitor the number of successive delivery strokes in which the ram pressure is below the predetermined value and if said number of successive strokes exceeds a predetermined total (e.g. ten) to shut the pump down until a further operating sequence is commenced. Said total may be selectively adjustable.

In an alternative operating arrangement the control means monitors the number of delivery strokes in which the ram pressure is below the predetermined value and which occur within a predetermined period, whether or not they occur in immediate succession to each other (i.e. there may also be some strokes at higher pressure within the period). Shut down will occur if the predetermined number is exceeded. Again provision may be made for selective adjustment of the length of said period and/or said predetermined number of said lower pressure strokes.

The invention further resides in a de-sludging system including pumping apparatus as defined above in combination with one or more settling tanks or other process or holding vessels. Said system may form part of a sewage or other effluent treatment or water purification installation including a settlement tank or tanks of known kind which may incorporate scraper mechanism or the like for assisting in the concentration of the sludge at the bottom of the or each tank for periodic automatic removal by said pumping apparatus.

THE DRAWINGS

An example of the invention as incorporated in a sewage treatment or like installation is now more particularly described with reference to the accompanying drawings wherein.

DETAILED DESCRIPTION

Figure 1:
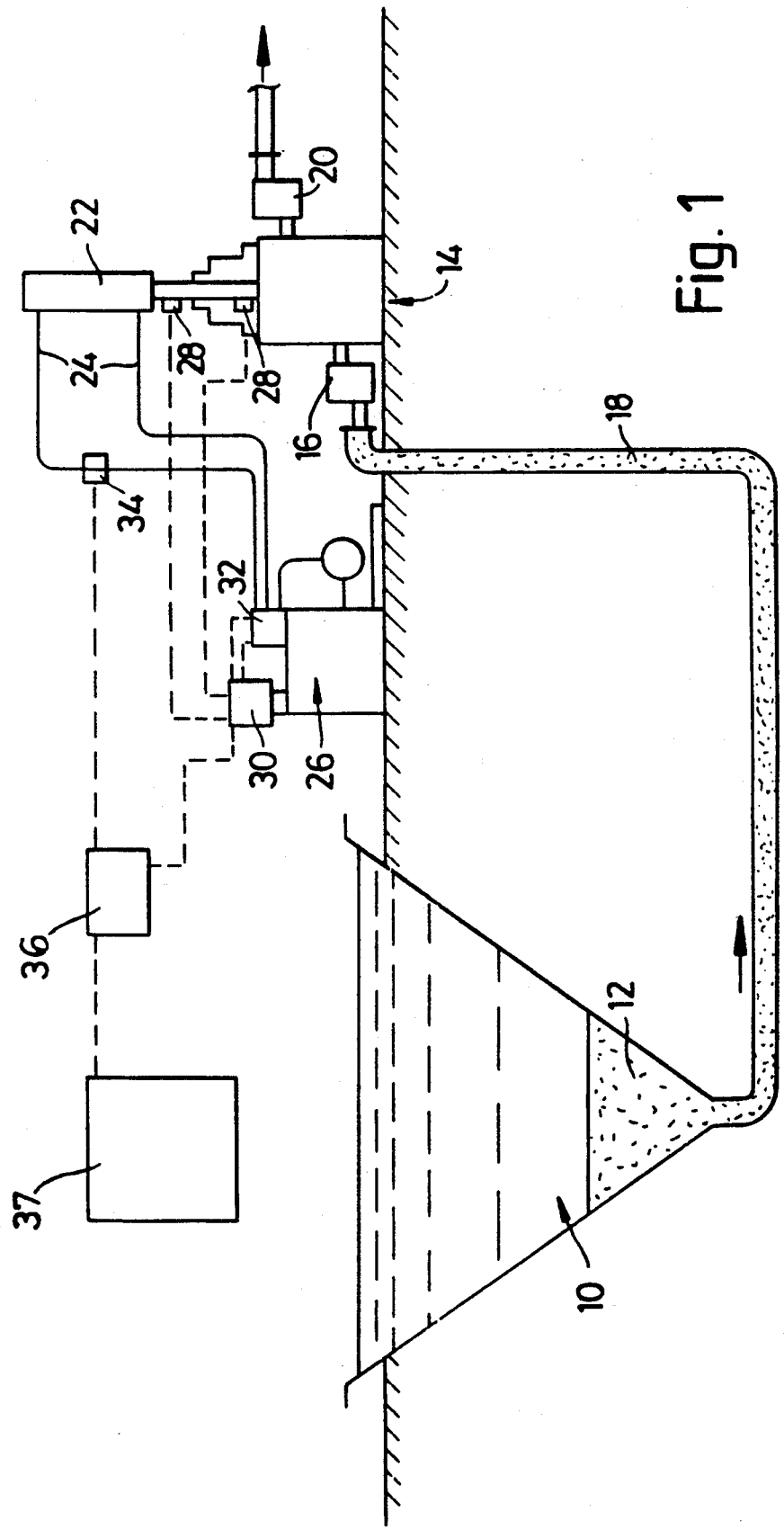
FIG. 1 is a diagram of the relevant parts of said installation.

The installation includes, in this example, a single sludge settling tank of known construction for receiving sewage or other effluent in known manner (infeed not shown). Tank 10 is of conventional construction being generally conical in vertical section, the sludge 12 settling in a lowermost and narrowest sump portion of the tank. The tank may include revolving scraper mechanism or the like (not shown) to assist in the settlement process.

The accumulated sludge 12 has to be periodically removed to enable effective operation to continue and said removal is effected by a hydraulically powered ram type positive displacement pump 14, of known construction. An inlet connection 16 of the pump is coupled to a suction pipe 18 by way of a one way inlet check valve and said pipe connects with the sump bottom of tank 10. A delivery outlet 20 also provided with a one way check valve discharges the pump sludge to a delivery or further processing station (not shown).

The single acting main ram of pump 14 is driven by a double acting hydraulic power ram 22 directly coupled through a cross head above the pump ram in known manner.

Ram 22 is connected by hydraulic lines 24 to an electrically powered hydraulic power supply unit 26.

The pump is provided with stroke sensing means comprising a pair of spaced proximity switches 28 co-acting with the pump cross-head to provide signals when the pump ram reaches the upper and lower limits of its stroke, said signals being applied in a printed circuit board based pump drive section 30 of control means of the apparatus, the electrical connections being shown in broken lines in FIG. 1. This part of the control means operates to reverse the hydraulic power flow in lines 24 automatically for reciprocating motion of the pump ram by way of solenoid operated distribution valves 32 of the hydraulic circuit.

Said control means further includes a pressure transducer 34 (shown also in the diagram of FIG. 2) which is responsive to the pressure carried in the hydraulic line 24 transmitting the driving force to ram 22 for effecting the delivery strokes of the pump.

The pressure in that line 24 is directly related to the effort required to shift the pump ram and this effort is a direct function of the density of the material being pumped, the thick high density sludge providing much greater resistance than the effluent in tank 10 before its sludge content has settled or separated.

Figure 2:
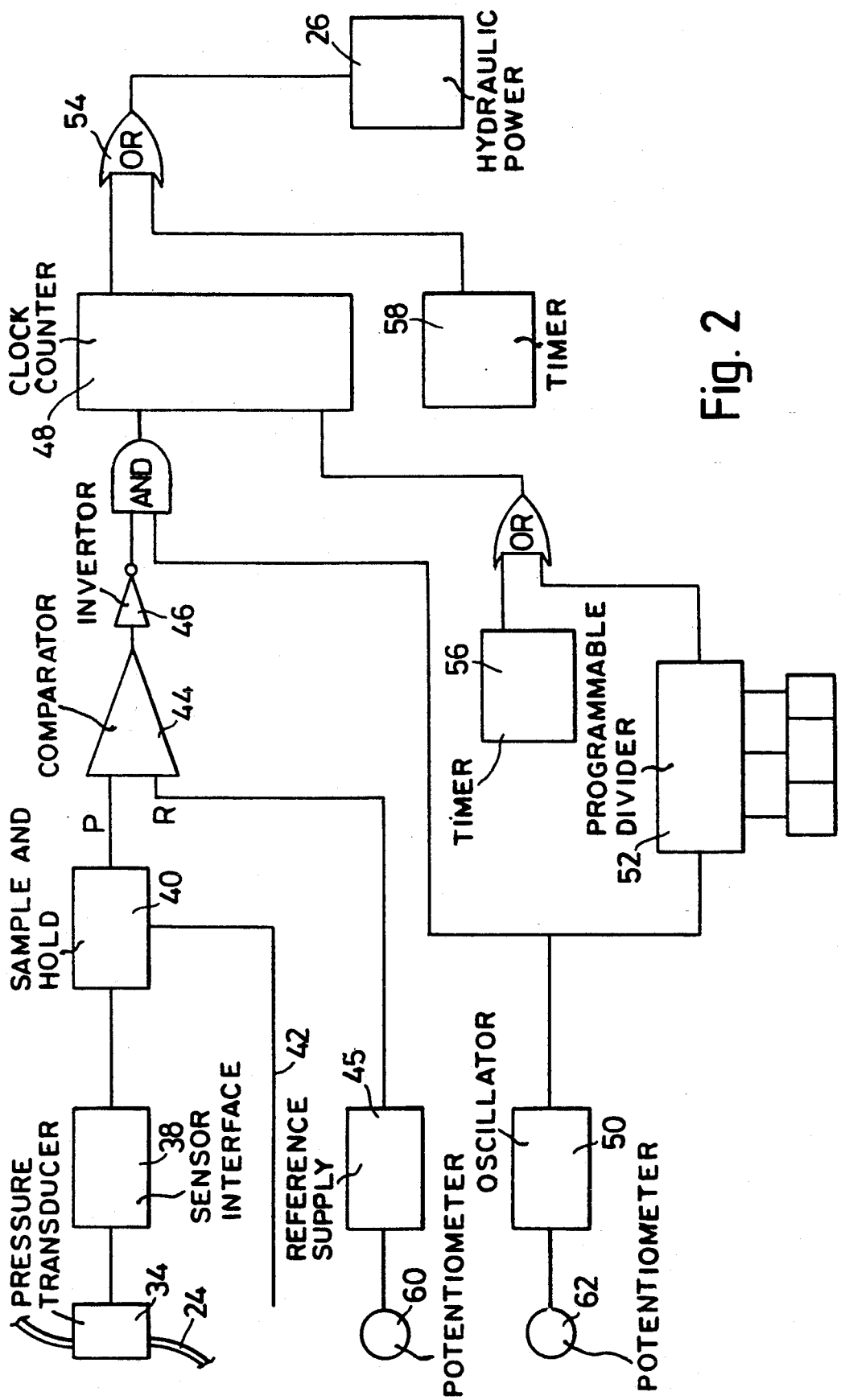
FIG. 2 is a block diagram of control means of pumping apparatus in the installation.

The control means further includes a printed circuit board based automatic de-sludging control section 36, the logic and other features of said section being shown in greater detail in block diagram form in FIG. 2, and a control panel 37 for starting up and/or manual control of the pump.

The signal from sensor 34 is applied through a sensor interface 38 and a sample and hold device 40, the latter also having infeed from a delivery stroke relay of the pump drive section 30 via line 42 so that only the delivery drive/pressure is utilised, to a comparator 44 in which said signal is compared to a preset value derived from a selectively adjustable reference supply 45. If the incoming signal is determined as having a lower value than the preset reference supply it will indicate that the delivery pressure of the pump (i.e. the density of the material it is handling) is less than the predetermined value and comparator 44 will emit a low pressure signal through an invertor 46.

The pump will be subjected to transient fluctuations in operating pressure due to non-uniform density of the pump sludge, e.g. "slugs" of thick material followed possibly by voids or air pockets or a volume of much thinner i.e. more fluid material and in order to filter out these short term variations the control section 36 further includes a timing device.

The signals from invertor 46 are sent to a clock counter 48 which stores and totals the number of signals received in sequence, in this example to a total of ten. A timed period is also applied to counter 48 by way of an adjustable timer driven by a variably settable oscillator 50 in conjunction with a programmable divider 52. Divider 52 can be preset to determine periods during which the clock counter 48 totalises its stroke count, if the count to the preset total, e.g. ten, is achieved within the preset period, i.e. there are ten successive low pressure signals within that period an output signal is given through an "OR" gate 54 to relays of the pump power unit 26 to initiate a shut down procedure so that pumping will cease i.e. pumping ceases when the accumulated sludge 12 has been substantially removed from tank 10, and the pump does not start again until a further accumulation has taken place.

If the count of e.g. ten is not achieved within the preset period clock counter 48 resets automatically to zero and a further count of e.g. ten takes place.

The control section 36 further includes two adjustable timers 56, 58 which operate to determine a minimum pumping time e.g. for initial start up and pumping irrespective of the discharge pressure, and a maximum pumping time automatically initiating pump shut down after a preset maximum period (e.g. five minutes) respectively.

Respective potentiometer settings 60, 62 are included for adjustment of the reference supply 45 providing the comparator value, and the frequency of oscillator 50 providing the time base for the clock counter 48.

It will be noted that the pressure sensing is derived from the clean and uniform hydraulic drive fluid of the pump thus it is not necessary to provide transducers or other devices for sensing the sludge density or level in the hostile environment of the tank 10 or pipe and inlet or outlet connections 16, 18, 20, thus ensuring continued reliable operation and facilitating servicing and maintenance.

Further operations of the pump will be initiated automatically at timed intervals after shut down so that the density of the accumulation in tank 10 is sampled regularly. If the density is below the predetermined level the pump will shut off again after the ten (or other total) stroke cycle or time limited stroke cycle. If the density is higher pumping will continue until the accumulated sludge is drawn off.

Various extra facilities may be incorporated in the basic apparatus and system of the invention.

The timing means may include a "real time" operating sequence, e.g. to be preset to commence an operating cycle of the pump at a given time or times each day independently of the actual sludge content of the tank at that time or times.

An installation may include more than one settling tank or other process or holding vessel served by a common pumping apparatus and associated control means, thus providing substantial economy in capital and installation costs. Isolating valves will be included so that the input to the pump can be switched from one tank to the other or others in turn. The control means may be arranged for automatic change over in sequence, i.e. to switch over to the next tank as soon as de-sludging of one tank finishes; or the sequence may be stepped, i.e. with a predetermined time interval (which may be adjustable) between operations on successive tanks e.g. where one tank accumulates sludge faster than another; or the change over may be non-automatic i.e. selected by operation of manual controls as and when required.

In the operation of settling tanks during treatment of sewage or like waste products there is commonly buildup of scum comprising fatty and other substances on the surface of the liquid in the tank as well as accumulation of sludge in the bottom of the tank as referred to above. It is necessary to remove this scum periodically by skimming it from the surface into a scum collecting tank. Disposal of the contents of the latter tank may conveniently be arranged by using the pumping apparatus and control means provided for de-sludging the settlement tank by changing over as and when necessary in the manner referred to above.

The read-out from pressure transducer 34 may further be utilised to detect blockage of the suction pipe 18 or the associated inlet connection 16. If this condition occurs no material, whether sludge, fluid or otherwise, can reach the pump hence there will be little or no resistance to its delivery strokes so that the pressure sensed by sensor 34 will be substantially lower than even that required to cause comparator 44 to emit the low pressure signal referred to above.

Comparator 44 may be arranged to respond to occurrence of this condition by emitting a distinctive ultra-low pressure signal and again, to accommodate transient fluctuations in operating pressure (as when only a temporary blockage or choking occurs which may be cleared by subsequent strokes of the pump) the ultra-low signals may conveniently be sent to a further clock counter which stores and totals the number of such signals received over a given pre-set (and adjustable) period. If the predetermined limit on the number of ultra-low pressure strokes within the period is reached or exceeded control section 36 will be activated to shut-down the pump and/or provide an alarm signal for action to be taken to rectify the stoppage.

The control panel 37 (or a display panel at some convenient location) will preferably include an LED or other digital or analogue display showing the pressure of the hydraulic operating fluid derived from the sensor 34. As already explained, this pressure is related to the properties, e.g. pressure or density, of the material being handled by the pump. A facility may be provided for switching said display to show values which are function of said properties, e.g. a read-out of the pressure of the sludge or other material during handling by the pump. As the ratio between the pressure read by the sensor 34 and that of the sludge or other material will be related to the physical characteristics of the pump, e.g. the effective areas of the hydraulic driving ram piston and the pump main ram, size of inlet and outlet ducts etc., a provision for adjustment to calibrate the read-out relative to the particular installation will be provided. In this way a standard control means can be provided for use with a range of pump capacities and types, being individually adjusted to suit each installation.

Having now described our invention what we claim is:

1. Pumping apparatus for automatic de-sludging including a ram-type positive displacement pump having a suction inlet connection for operatively drawing accumulations of sludge from a settling tank or other processing or holding vessel and a delivery outlet for onward transmission of said sludge; hydraulic drive means powering the pump for reciprocation of the pump ram; and control means including a pressure transducer providing a signal which is a function of the pressure exerted by said ram in the course of each delivery stroke of the pump, and feedback means regulating operation of the pump automatically as a function of said signal whereby said operation is suspended or deferred when said pressure exerted by said ram falls below a predetermined level due to the lower viscosity of the material passing through the pump once an accumulation of sludge has been substantially removed from said vessel.

2. Apparatus as in claim 1 wherein the pressure transducer is arranged to sense the pressure of hydraulic fluid in the hydraulic drive means.

3. Apparatus as in claim 1 wherein the control means includes a stroke counting device for providing a read-out of the number of delivery strokes effected by the pump.

4. Apparatus as in claim 1 wherein the control means includes a timing device for providing a read-out of the time taken for completion of a delivery stroke or sequence of delivery strokes.

5. Apparatus as in claim 1 including timing means operable for automatic initiation of operation of the pump at predetermined intervals from preceding operations thereof.

6. Apparatus as in claim 1 including timing means operable for automatic initiation of operation of the pump at predetermined intervals of real time regardless of preceding operations.

7. Apparatus as in claim 1 including a display for showing a value which is a function of said pressure exerted by the pump ram so as to represent a property or properties of the material being handled by the pump.

8. Apparatus as in claim 1 in which the control means is arranged to monitor the number of successive delivery strokes in which the ram pressure is below a predetermined value and to shut the pump down for a period if said number exceeds a predetermined total.

9. Apparatus as in claim 8 wherein said predetermined value of the ram pressure is a first ram pressure value which is the result of delivery of material drawn from the holding vessel but having a density less than that of the sludge, said control means also monitoring delivery strokes in which the ram pressure is below a second ram pressure value substantially lower than the first value which is the result of substantially no material from the vessel reaching the pump for delivery as when there is blockage of the suction inlet to provide an ultra-low pressure signal to the feedback means.

10. Apparatus as in claim 1 in which the control means is arranged to monitor the number of delivery strokes, whether successive or otherwise, in which the ram pressure is below a predetermined value within a predetermined period and to shut the pump down for a period if said number within said period exceeds a predetermined total.

11. Apparatus as in claim 10 wherein the control means includes provision for selective adjustment of a parameter selected from values representing said number of strokes, said predetermined ram pressure, and the length of said predetermined period.

* * * * *